(12) United States Patent
Nakagawa (10) Patent No.: US 11,093,206 B2
(45) Date of Patent: Aug. 17, 2021

(54) COMMUNICATION APPARATUS, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Toshiyuki Nakagawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 427 days.

(21) Appl. No.: 15/643,809

(22) Filed: Jul. 7, 2017

(65) Prior Publication Data
US 2018/0024805 A1    Jan. 25, 2018

(30) Foreign Application Priority Data
Jul. 22, 2016    (JP) .............................. JP2016-144753

(51) Int. Cl.
G06F 3/14    (2006.01)
H04L 29/06    (2006.01)
(Continued)

(52) U.S. Cl.
CPC .......... *G06F 3/1454* (2013.01); *G06F 3/0482* (2013.01); *G06F 21/84* (2013.01);
(Continued)

(58) Field of Classification Search
CPC ...... G06F 3/1454; G06F 3/0482; G06F 21/84; H04N 19/102; H04L 65/4069; G09G 2370/16
See application file for complete search history.

(56) References Cited

U.S. PATENT DOCUMENTS 8,416,767 B2 *   4/2013   Wang .................. H04L 65/1083
                                                      370/352
9,626,530 B2    4/2017   Xiao
(Continued)

FOREIGN PATENT DOCUMENTS

CN    102255949 A    11/2011
CN    103092510 A    5/2013
(Continued)

OTHER PUBLICATIONS

Extended European Search Report issued in European Application No. 17182158.0 dated Nov. 6, 2017.
(Continued)

*Primary Examiner* — Chris Parry
*Assistant Examiner* — Abderrahmen Chouat
(74) *Attorney, Agent, or Firm* — Rossi, Kimms & McDowell LLP (57) ABSTRACT

A communication apparatus communicates with another communication apparatus and to transmit image data by one of: a first communication mode in which image data displayed on a display unit of the communication apparatus is transmitted to the another communication apparatus; and a second communication mode in which image data stored on the communication apparatus is transmitted to the another communication apparatus and is not displayed on the display unit, and determines whether to continue image data transmission. After image data is transmitted according to the second communication mode and the second communication mode is terminated, the communication apparatus continues transmitting the image data according to the first communication mode in the case that it is determined to continue the image data transmission, and terminates the image data transmission in the case that it is determined not to continue the image data transmission.

9 Claims, 9 Drawing Sheets

(51) Int. Cl.
  *G06F 21/84* (2013.01)
  *G06F 3/0482* (2013.01)
  *H04N 19/102* (2014.01)
(52) U.S. Cl.
  CPC ...... *H04L 65/1083* (2013.01); *H04L 65/4015* (2013.01); *G06F 3/14* (2013.01); *G09G 2370/16* (2013.01); *H04L 65/4069* (2013.01); *H04N 19/102* (2014.11)

(56) References Cited

U.S. PATENT DOCUMENTS

| | | | | |
|---|---|---|---|---|
| 2002/0122401 | A1* | 9/2002 | Xiang | H04W 76/16 370/338 |
| 2004/0127251 | A1* | 7/2004 | Thakkar | H04Q 3/0045 455/552.1 |
| 2006/0031779 | A1 | 2/2006 | Theurer | |
| 2006/0136828 | A1* | 6/2006 | Asano | G06F 3/1454 715/733 |
| 2010/0050006 | A1* | 2/2010 | Nishibayashi | G06F 1/3209 713/320 |
| 2013/0219072 | A1* | 8/2013 | Han | H04L 65/602 709/228 |
| 2014/0215356 | A1* | 7/2014 | Brander | G06F 3/14 715/753 |
| 2015/0058450 | A1* | 2/2015 | Hahm | H04L 65/4084 709/219 |
| 2015/0095510 | A1* | 4/2015 | Bhorkar | H04L 12/2805 709/231 |
| 2016/0073155 | A1* | 3/2016 | Subramaniam | H04N 21/4316 725/32 |
| 2016/0110151 | A1 | 4/2016 | Isonishi | |
| 2016/0309532 | A1* | 10/2016 | Yu | H04W 4/21 |

FOREIGN PATENT DOCUMENTS

| | | |
|---|---|---|
| CN | 104052788 A | 9/2014 |
| CN | 104202461 A | 12/2014 |
| CN | 204362241 U | 5/2015 |
| CN | 104717549 A | 6/2015 |
| EP | 2940578 A1 | 11/2015 |
| JP | 2006163994 A | 6/2006 |
| JP | 2014002581 A | 1/2014 |
| KR | 1020030011476 A | 2/2003 |
| KR | 100696827 B1 | 3/2007 |
| KR | 1020130095519 A | 8/2013 |
| KR | 1020150022532 A | 3/2015 |
| WO | 2013191037 A1 | 12/2013 |

OTHER PUBLICATIONS

Office Action issued in Chinese Application No. 201710575552.9 dated Mar. 20, 2020. English translation provided.
Office Action issued in Korean Appln. No. 10-2017-0088829 dated Feb. 18, 2020.

* cited by examiner

COMMUNICATION APPARATUS, METHOD OF CONTROLLING THE SAME, AND NON-TRANSITORY COMPUTER-READABLE STORAGE MEDIUM

BACKGROUND OF THE INVENTION

Field of the Invention

The present invention relates to a technique of transmitting an image to another apparatus via a network.

Description of the Related Art

Recently, a technique of wirelessly mirroring a monitor screen has been standardized as Wi-Fi Display (Wi-Fi Miracast®). Mirroring is a technique of transmitting the monitor screen of a transmission apparatus to a reception apparatus via a network and sharing the monitor screen. Roles such as a source device having a function of transmitting the monitor screen and a sink device having a function of receiving the monitor screen are defined in Wi-Fi Display.

There are, for example, two methods as a method of screen sharing according to a Wi-Fi Display standard. The first method is a method of capturing, encoding, and then transmitting a video reproduced on the display screen (an image displayed on the display screen) of the source device (to be referred to as a mirroring mode hereinafter). The second method is a method of multiplexing and transmitting a video which is stored in a storage device of the source device and is not reproduced on the display screen (an image which is not displayed on the display screen) in a predetermined method without capturing and encoding it (to be referred to as a direct mode hereinafter).

On the other hand, there has been proposed a method of determining whether data transmission is enabled/disabled in accordance with an application to be executed and transmitting alternative data stored in advance if it is determined that the data transmission is disabled when data reproduced in the source device is externally output by utilizing a wireless LAN (see Japanese Patent Laid-Open No. 2014-2581).

As an operation at the end of screen sharing by the direct mode of Wi-Fi Display, one of operations of continuing screen sharing and terminating the screen sharing by the mirroring mode is considered. Note that the screen sharing can be terminated by a user operation or when a predetermined time has elapsed since the stored video was reproduced. In the case of the former operation at the end of the screen sharing, a highly confidential screen of the source device may unintentionally be displayed on the screen of the sink device. In the case of the latter operation, a screen operation (for example, selection of a specific image from an image list or the like) of the source device cannot be performed while confirming the operation on the screen of the sink device after the end of the direct mode.

Further, in Japanese Patent Laid-Open No. 2014-2581, whether the data transmission is enabled/disabled is determined in accordance with the application to be executed, making it impossible to switch between the disabled/enabled states of the data transmission while a specific application is executed.

SUMMARY OF THE INVENTION

The present invention provides a technique of solving the above-described problems.

According to one aspect of the present invention, there is provided a communication apparatus, which comprises: a communication unit configured to communicate with another communication apparatus and to transmit image data by one of: a first communication mode in which image data displayed on a display unit of the communication apparatus is transmitted to the another communication apparatus; and a second communication mode in which image data stored on a storage unit of the communication apparatus is transmitted to the another communication apparatus and is not displayed on the display unit of the communication apparatus; and a determination unit configured to determine whether to continue image data transmission, wherein after image data is transmitted according to the second communication mode and the second communication mode is terminated the communication unit is configured to: continue transmitting the image data according to the first communication mode in the case that the determination unit determines to continue the image data transmission; and terminate the image data transmission in the case that the determination unit determines not to continue the image data transmission.

Further features of the present invention will become apparent from the following description of exemplary embodiments (with reference to the attached drawings).

DESCRIPTION OF THE EMBODIMENTS

The present invention will be described in detail below based on embodiments of the present invention with reference to the accompanying drawings. Note that arrangements shown in the following embodiments are merely examples, and the present invention is not limited to the illustrated arrangements.

First Embodiment

Figure 1:
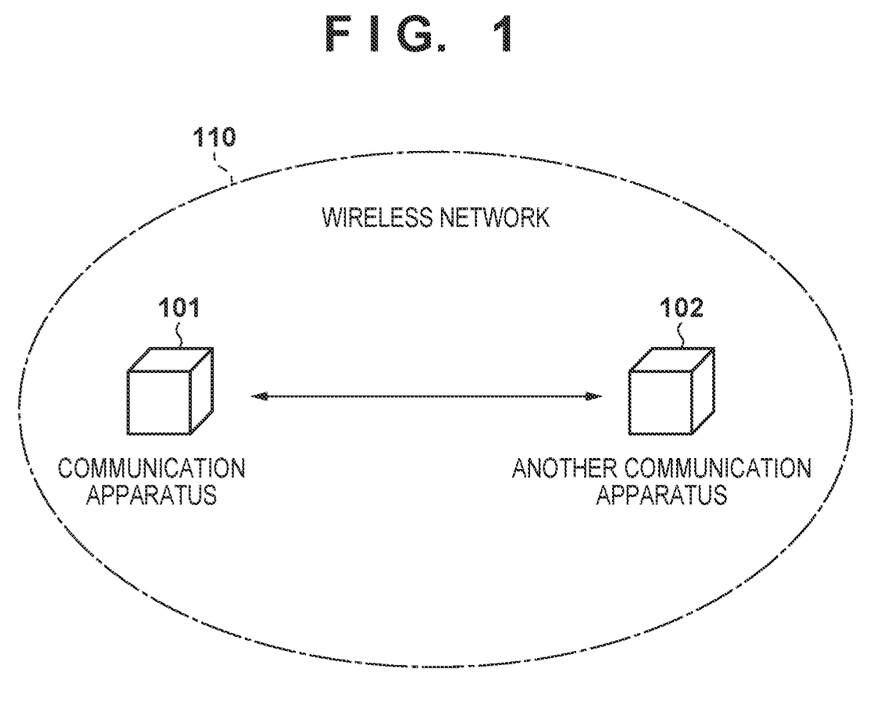
FIG. 1 is a view showing the network configuration of a communication system according to the first embodiment.
Figure 2A:
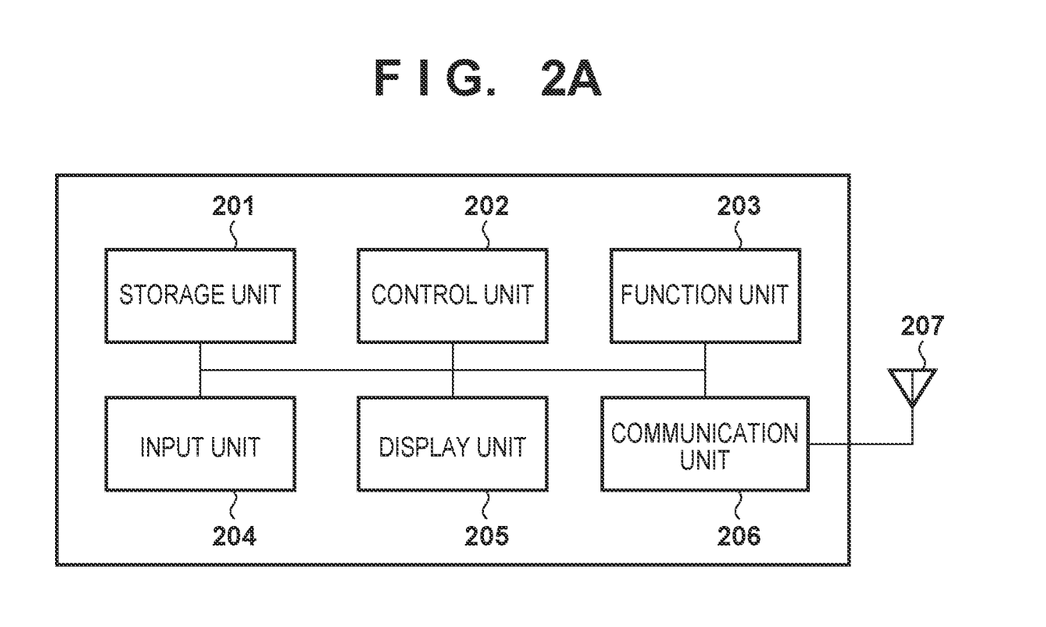
FIGS. 2A and 2B are block diagrams each showing the arrangement of a communication apparatus 101.

FIG. 1 shows the network configuration of a communication system according to this embodiment. A communication apparatus 101 can perform wireless communication with another communication apparatus 102. Note that the communication apparatus 101 acts as a source device which transmits a monitor screen displayed in a display unit 205 (FIG. 2A). That is, the communication apparatus 101 can transmit image data in a mirroring mode and a direct mode. The mirroring mode is an operation mode in which the communication apparatus 101 transmits a video reproduced in the display unit 205 (image data displayed in the display unit 205). The direct mode is an operation mode in which the communication apparatus 101 transmits a video which is stored in a storage unit 201 (FIG. 2A) and is not displayed in the display unit 205 (image data which is not displayed in the display unit 205). Image data transmitted in the mirroring mode and the direct mode is a moving image or a still image, and includes not only an image such as a photograph or a video but also data such as a document or graphics. The other communication apparatus 102 acts as a sink device which receives and reproduces a video transmitted from the source device. Image input apparatuses such as a tablet, a smartphone, a PC, a cellular phone, a camera, and a video camera are given as practical examples of the source device. However, the present invention is not limited to these as long as they satisfy a hardware arrangement (FIG. 2A) and a functional arrangement (FIG. 2B) to be described later. Image output apparatuses such as a tablet, a smartphone, a PC, a cellular phone, a TV set, a set-top box, a head mounted display, a projector, a display, and a car navigation apparatus are given as practical examples of the sink device. However, the present invention is not limited to these.

Note that in this embodiment, a description will be given assuming that the communication apparatus 101 performs communication by a wireless LAN conforming to the IEEE802.11 series. However, the arrangement of this embodiment is also applicable to other wireless communication systems such as Bluetooth®, UWB, ZigBee, and MBOA. Further, the arrangement of this embodiment is also applicable to a wired communication system such as a wired LAN. The communication apparatus 101 and the other communication apparatus 102 may communicate with each other via a relay apparatus (not shown) (such as an access point), in addition to communicating with each other directly. Note that MBOA stands for Multi Band OFDM Alliance. UWB includes a wireless USB, wireless 1394, WINET, or the like.

FIGS. 2A and 2B, respectively, show the hardware arrangement and functional arrangement of the communication apparatus 101. First, the hardware arrangement in FIG. 2A will be described. The storage unit 201 is constituted by a memory such as a ROM or a RAM, and stores various types of information such as programs for performing various operations to be described later and a communication parameter for wireless communication. Note that in addition to the memory such as the ROM or the RAM, a storage medium such as a flexible disk, a hard disk, an optical disk, a magnetooptical disk, a CD-ROM, a CD-R, magnetic tape, a non-volatile memory card, or a DVD may be used as the storage unit 201. The storage unit 201 may include, for example, a plurality of memories.

Figure 2B:
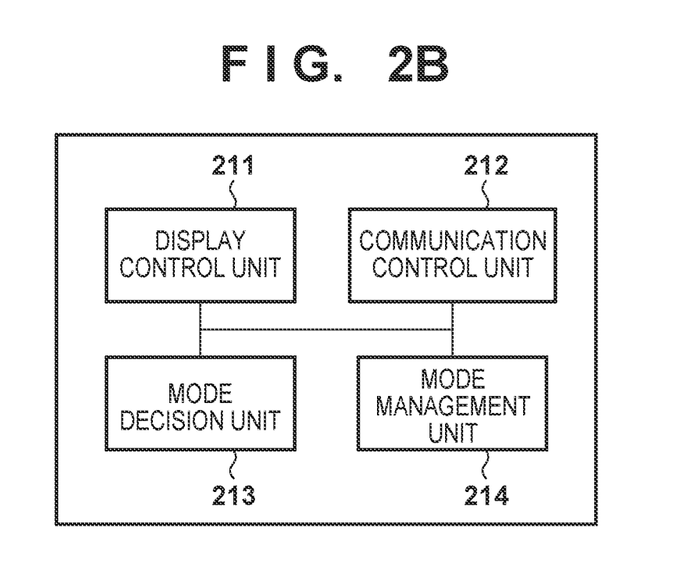

A control unit 202 is constituted by a processor such as a CPU or an MPU, and controls the entire communication apparatus 101 by executing a program stored in the storage unit 201 and at least implementing the functional arrangement shown in FIG. 2B. Note that the control unit 202 may control the entire communication apparatus 101 by cooperation between an OS (Operating System) and the programs stored in the storage unit 201. Alternatively, the control unit 202 may include a plurality of processors such as multi-core processors and control the entire communication apparatus 101 by the plurality of processors.

The control unit 202 controls a function unit 203 to perform predetermined processing such as image capturing and projection. The function unit 203 is hardware for the communication apparatus 101 to perform the predetermined processing. For example, if the communication apparatus 101 is a camera, the function unit 203 is an image capturing unit and performs image capturing processing. Data processed by the function unit 203 may be data stored in the storage unit 201 or data communicated with another communication apparatus via a communication unit 206 to be described later.

An input unit 204 accepts various operations from a user. The display unit 205 performs various display operations. Note that the display unit 205 may perform, for example, vibration output or sound output by a loudspeaker. Note that both the input unit 204 and the display unit 205 may be implemented by one module like a touch panel.

The communication unit 206 controls IP communication or wireless communication conforming to the IEEE802.11 series. The communication unit 206 also controls an antenna 207 to transmit and receive a wireless signal for wireless communication. The communication apparatus 101 communicates image data with the other communication apparatus 102 via the communication unit 206. In this embodiment, a description will be given assuming that Wi-Fi Display is used as a communication system for mirroring the monitor screen by the wireless LAN. However, the present invention is not limited to Wi-Fi Display, but can use another similar communication system such as WiDi. In a Wi-Fi Display standard, Wi-Fi Direct is generally used for wireless connection. However, the present invention is not limited to this, but can also use wireless LAN connection by an infrastructure mode, wireless LAN connection by an ad hoc mode, or an ASP (Application Service Platform).

The functional arrangement in FIG. 2B will now be described. A display control unit 211 controls screen display for the display unit 205. A communication control unit 212 performs communication control regarding screen sharing via the communication unit 206. A mode decision unit 213 decides which of the mirroring mode and the direct mode in which the communication apparatus 101 operates when starting the screen sharing. A mode management unit 214 manages an operation mode after screen sharing processing is started.

Figure 3:
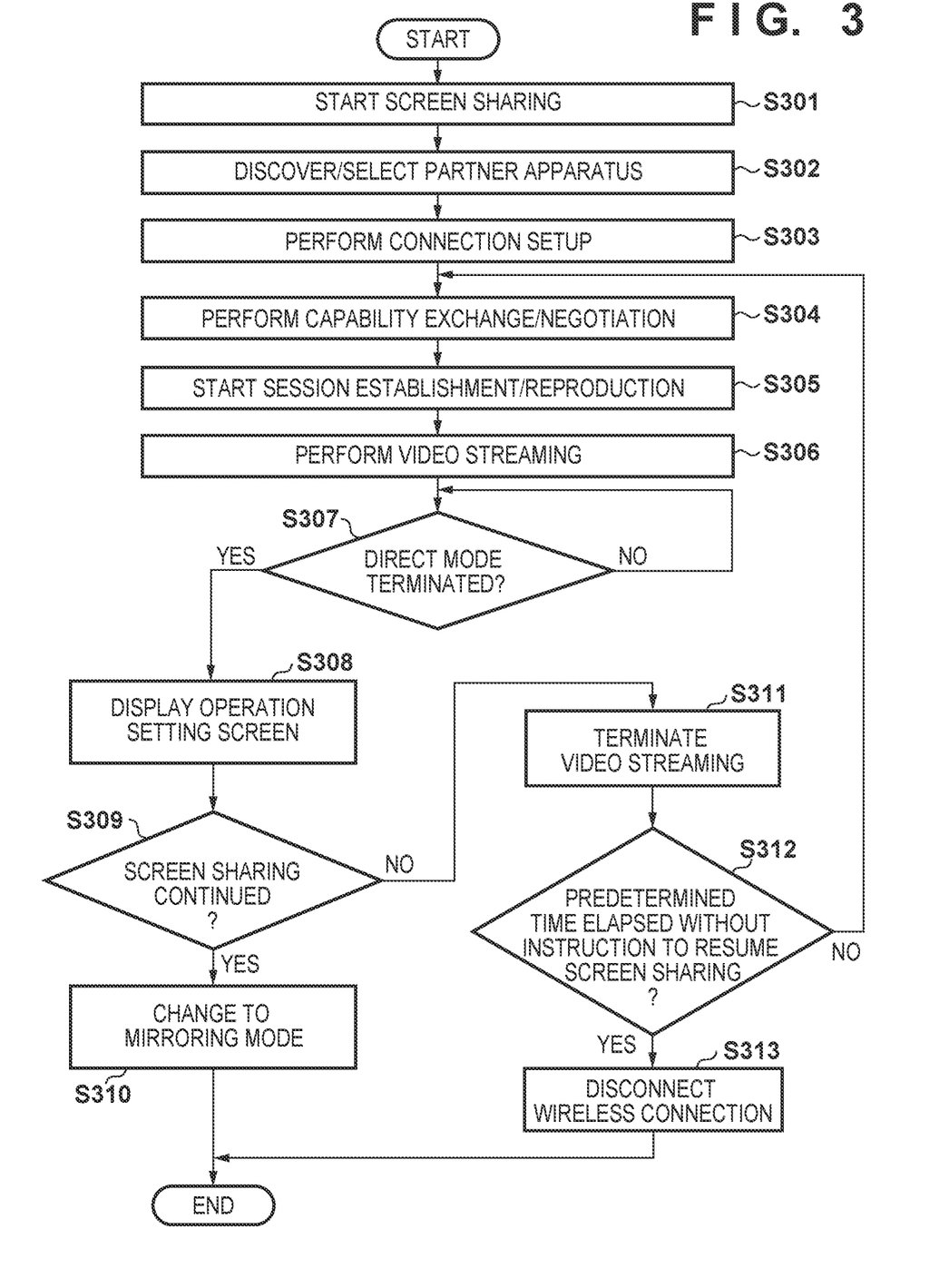
FIG. 3 is a flowchart showing an example of a procedure by which the communication apparatus 101 mirrors a monitor screen with another communication apparatus.

FIG. 3 is a flowchart showing the sequence of a process implemented by causing the control unit 202 to read out the programs stored in the storage unit 201 and execute them when the communication apparatus 101 transmits and receives the monitor screen with the other communication apparatus 102.

Note that at least a part of the flowchart shown in FIG. 3 may be implemented by hardware. When the flowchart is implemented by the hardware, for example, a dedicated circuit can be generated automatically on an FPGA from programs for implementing respective steps by using a predetermined compiler. The FPGA stands for Field Programmable Gate Array. Alternatively, the flowchart may be implemented as hardware by forming a Gate Array circuit, similarly to the FPGA. Alternatively, the flowchart may be implemented by an ASIC (Application Specific Integrated Circuit).

First, when the user performs a screen sharing start operation via the input unit 204, the communication control unit 212 starts screen sharing (step S301). An example of a screen at the time of step S301 will be now be described with reference to FIG. 4.

Figure 4:
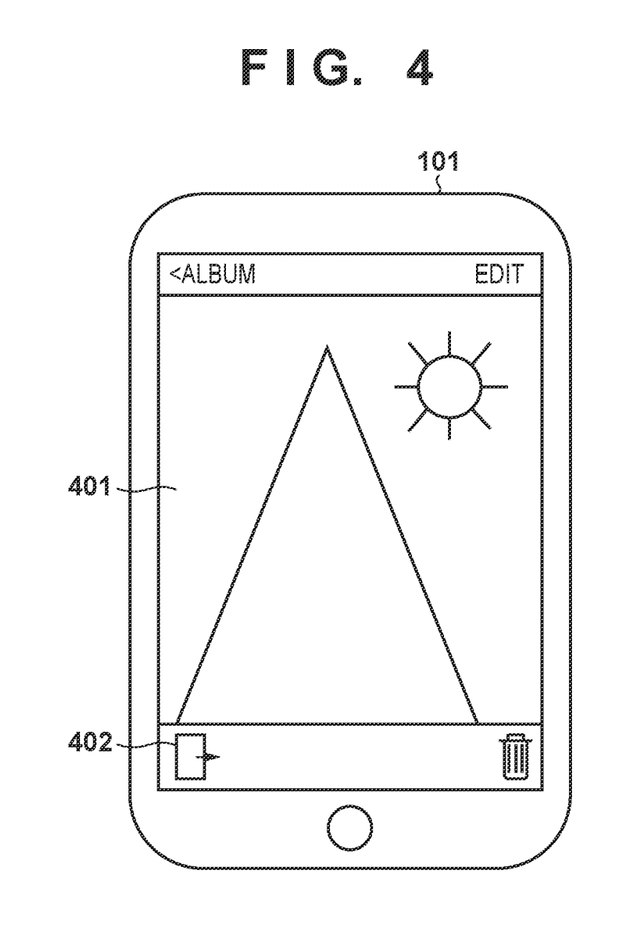
FIG. 4 is a view showing an example of a screen that the communication apparatus 101 starts screen sharing.

FIG. 4 shows an example of a screen in the display unit 205 when the communication apparatus 101 starts screen sharing. As shown in FIG. 4, the display control unit 211 displays an image 401 in the display unit 205 of the communication apparatus 101 and displays a screen sharing start button 402 in the lower portion of the image 401. The image 401 is, for example, a stored moving image loaded from the storage unit 201 by the display control unit 211.

When the user presses (alternatively, a selection operation such as sliding is included) the screen sharing start button 402, the communication control unit 212 starts screen sharing. In this embodiment, the mode decision unit 213 decides a mode (that is, the direct mode or the mirroring mode) at the start of the screen sharing in accordance with a data display state before the screen sharing start operation. When the screen sharing start operation is performed in a state selected by the user or a state in which the image stored in the storage unit 201 is displayed in the display unit 205 as in FIG. 4, the mode decision unit 213 decides to start the image sharing processing in the direct mode. On the other hand, when the screen sharing start operation is performed in a state which is not selected by the user or a state in which the image stored in the storage unit 201 is not displayed in the display unit 205 such as the standby screen or home screen of the communication apparatus 101, the mode decision unit 213 decides to start the image sharing processing in the mirroring mode.

Note that screen sharing by the direct mode is possible when the other communication apparatus 102 can decode image data in a format defined by the Wi-Fi Display standard. When the other communication apparatus 102 is incapable of decoding image data, or when data such as text data, presentation data, graphics data, a document, and a Web page or an application screen for viewing them is displayed in the display unit 205, the mode decision unit 213 decides to start the image sharing processing in the mirroring mode. Note that even if an initial mode is the mirroring mode, the mode decision unit 213 can switch over to the direct mode at a timing when the user selects the stored image. However, this is not the main subject to the present invention, and thus a description thereof will be omitted.

Subsequently to the start of the screen sharing in step S301, the communication control unit 212 discovers and selects the other communication apparatus 102 serving as a partner apparatus (step S302). The partner apparatus may be discovered and selected by the communication apparatus 101 or the partner apparatus. However, the communication apparatus 101 discovers and selects the partner apparatus in this embodiment. Based on the Wi-Fi Display standard, the communication control unit 212 discovers the partner apparatus by transmitting and receiving wireless frames such as a beacon, a probe request, and a probe response. Note that the communication control unit 212 can also utilize, for example, Bluetooth Low Energy (BLE), a QR Code®, or handover by a touch operation in Near Field Communication (to be referred to as NFC hereinafter). For example, if the communication unit 206 has an NFC communication function, pairing between the communication apparatus 101 and the other communication apparatus 102 is performed by an NFC touch operation, and subsequent communication is inherited to the Wi-Fi Display standard.

The communication control unit 212 further performs a connection setup with the partner apparatus selected in step S302 (step S303). Based on the Wi-Fi Display standard, the communication control unit 212 can utilize, for the connection setup, wireless frames such as a beacon, probe request/response, association request/response, reassociation request/response, GO negotiation request/response/confirmation, P2P invitation request/response, and provision discovery request/response. Note that GO stands for a Group Owner defined in a Wi-Fi Direct standard.

Subsequently, the communication control unit 212 performs capability exchange and a negotiation with the other communication apparatus 102 (step S304). In the Wi-Fi Display standard, it is defined that a RTSP (Real Time Streaming Protocol) is utilized for the capability exchange and the negotiation, and the communication control unit 212 exchanges predetermined messages from RTSP M1 to RTSP M4 with the other communication apparatus 102. The RTSP is a protocol for controlling streaming, and a TCP is generally used as a transport protocol in a lower layer.

Subsequently, the communication control unit 212 establishes a session and starts image transmission processing (step S305). In the Wi-Fi Display standard, the communication control unit 212 exchanges predetermined messages from RTSP M5 to RTSP M7 with the other communication apparatus 102 in order to start the establishment and reproduction of the session.

Upon completing the RTSP message exchange up to step S305, the communication control unit 212 performs video streaming (image data transmission) to the other communication apparatus 102 (step S306). In the Wi-Fi Display standard, an RTP (Real-time Transport Protocol) is used as a video streaming protocol. The RTP is a protocol for transmitting and receiving multimedia data such as a moving image and sound in real time via a network, and utilizes a UDP or the TCP as a transport protocol in the lower layer.

Subsequently, the mode management unit 214 determines whether to terminate the direct mode during the video streaming (step S307). The mode management unit 214 can determine, as this determination, for example, whether a stored video now under streaming reaches an end with the passage of time. The mode management unit 214 may determine whether an instruction to stop reproducing a video is made by a user operation to the input unit 204 or a remote operation from the other communication apparatus 102 to the input unit 204 such as a UIBC (User Input Back Channel) function defined by the Wi-Fi Display standard.

If the mode management unit 214 determines that the direct mode is terminated (Yes in step S307), the display control unit 211 displays an operation setting screen in the display unit 205, and the input unit 204 accepts a setting instruction by the user (step S308).

Figure 5:
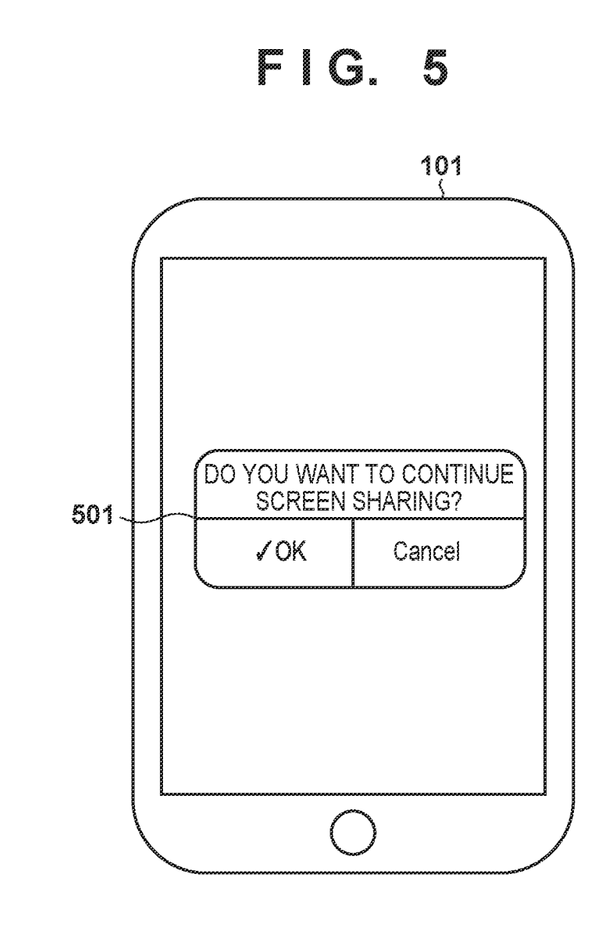
FIG. 5 is a view showing an example of an operation setting screen of the communication apparatus 101.

FIG. 5 shows an example of the operation setting screen displayed in the display unit 205 by the display control unit 211. The display control unit 211 displays, in the display unit 205, a selection area 501 capable of selecting whether to continue screen sharing. The user can select an OK button if he or she wants to continue the screen sharing and select a cancel button if he or she does not want to continue the screen sharing.

In step S309, based on the selection operation by the user in step S308, the mode management unit 214 determines whether to continue the screen sharing. If the user selects the OK button (Yes in step S309), the mode management unit 214 switches from the direct mode to the mirroring mode, and the communication control unit 212 continues to mirror the screen in accordance with the switching (step S310). Note that the switching (change) over to the mirroring mode can be made by causing the mode management unit 214 to set a parameter to a predetermined image format by RTSP SET_PARAMETER. Note that the image format to which the parameter is set is a format used when the video reproduced on the display screen of the source device is captured and encoded.

On the other hand, if the user selects the Cancel button (NO in step S309), the mode management unit 214 determines to complete the screen sharing. In response to this, the communication control unit 212 terminates the video streaming (step S311). In the Wi-Fi Display standard, the video streaming is terminated by exchanging a RTSP TEARDOWN (M8) message with the other communication apparatus 102. As a result, the sessions of the RTSP and the aforementioned RTP are disconnected.

Subsequently, the mode management unit 214 determines the presence/absence of an instruction to resume the screen sharing (step S312). The mode management unit 214 can make this determination by detecting whether the user presses the screen sharing start button in FIG. 4 or whether the input unit 204 accepts an image selection operation by the user. In step S312, if the mode management unit 214 determines that a predetermined time has elapsed without the instruction to resume the screen sharing (Yes in step S312), disconnection of the wireless connection is decided. In response to this, the communication control unit 212 disconnects the wireless connection and terminates the screen sharing processing (step S313). Note that a predetermined time (timeout time) here can be preset to an arbitrary time and be set to time 0. For the time 0, the communication control unit 212 can disconnect the wireless connection immediately if there is no instruction to resume the screen sharing. Alternatively, a screen for causing the user to instruct "whether to disconnect the wireless connection?" may be displayed when the user selects the Cancel button on the screen of FIG. 5, and then the process may advance to step S313 in accordance with the instruction of the user using that screen.

On the other hand, in step S312, if the mode management unit 214 determines that there is the instruction to resume the screen sharing within the predetermined time (No in step S312), the process returns to step S304. Then, the communication control unit 212 executes, all over again, the process from the capability exchange and the negotiation with the other communication apparatus 102. Note that the instruction to resume the screen sharing refers to, for example, an operation such as pressing a screen sharing resume button shown in FIG. 4. However, the present invention is not limited to this, but the instruction may be a selection operation, reproduction operation, or the like of the stored image by the user.

As described above, the process of the flowchart in FIG. 3 allows the communication apparatus 101 to control, as the intention of the user, the operation of whether to continue the screen sharing at the end of the direct mode.

Connection processing of an entire system by the communication apparatus 101 and the other communication apparatus 102 of this embodiment will now be described with reference to FIGS. 6 to 8.

Figure 6:
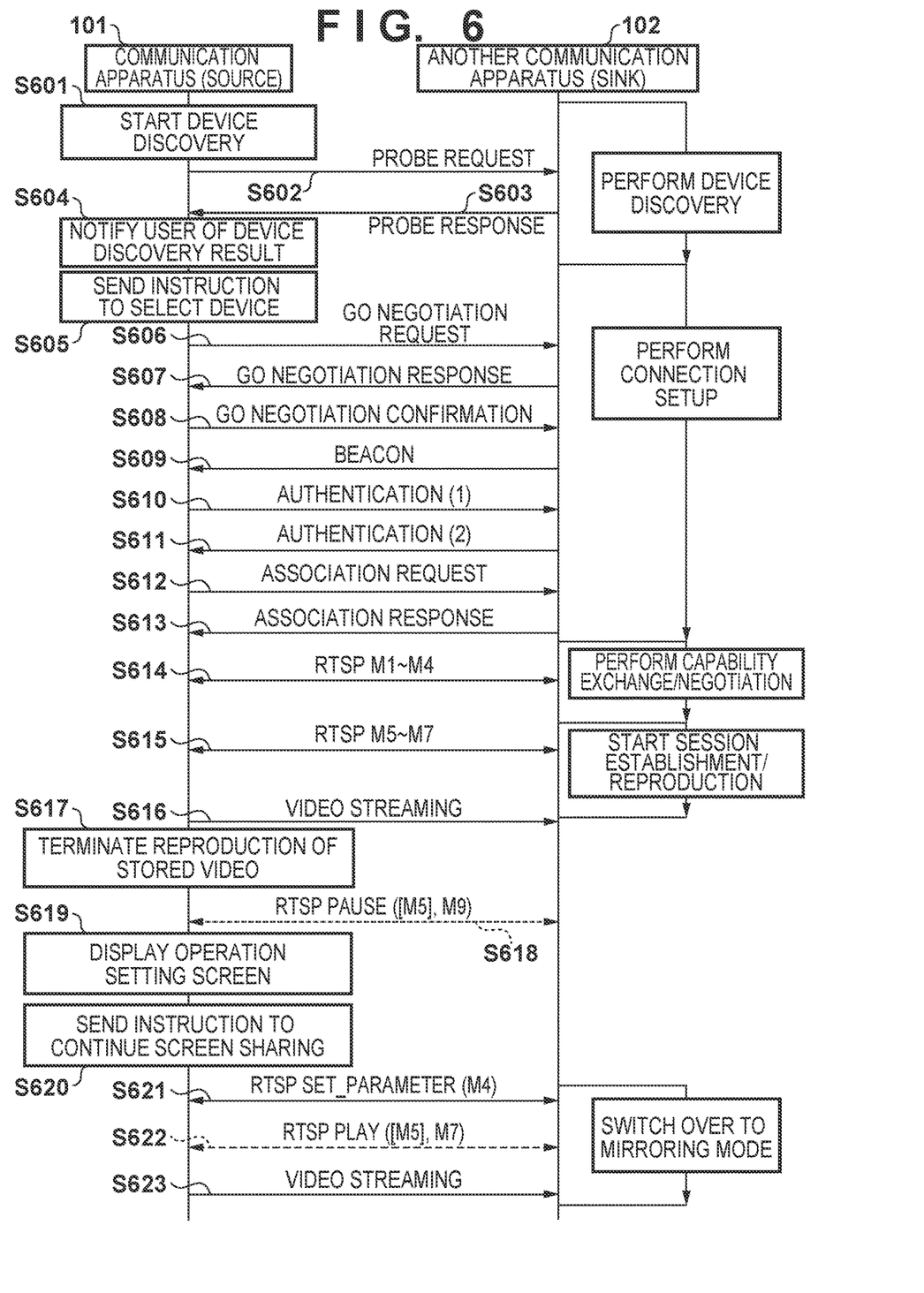
FIG. 6 is a sequence chart for explaining a connection sequence with another communication apparatus 102 when the communication apparatus 101 continues screen sharing in a mirroring mode after the end of a direct mode.

FIG. 6 is a sequence chart for explaining a connection sequence with the other communication apparatus 102 when the communication apparatus 101 continues screen sharing in the mirroring mode after the end of the direct mode. In general, in the sequence of Wi-Fi Display, video streaming (step S616) is started after the respective steps of a device discovery (steps S601 to S604), connection setup (steps S605 to S613), capability exchange/negotiation (step S614), and session establishment/reproduction start (step S615). Note that a step of discovering a service before the connection setup (steps S605 to S613) or the like is also prepared as the optional standard of Wi-Fi Display. However, it is not used in this embodiment for the sake of descriptive simplicity.

In the device discovery steps (steps S601 to S604) of the communication apparatus 101 and the other communication apparatus 102, the communication apparatus 101 and the other communication apparatus 102 transmit and receive a probe request (step S602) and a probe response (step S603) by an instruction to start the device discovery (step S601) from the communication apparatus 101 serving as the source device. Note that the other communication apparatus 102 serving as the sink device can also start the device discovery. Wireless frames transmitted and received at the time of the device discovery are defined by the Wi-Fi Direct standard, and a beacon and the like are also available. The communication apparatus 101 detects the other communication apparatus 102 by receiving the probe response (step S603) from the other communication apparatus 102, and the user is notified of a device discovery result via the display unit 205 (step S604).

In the connection setup steps (steps S605 to S613) of the communication apparatus 101 and the other communication apparatus 102, first, the user of the communication apparatus 101 selects the other communication apparatus 102 from the list of discovered devices displayed in the display unit 205 (step S605). After the selection, the communication apparatus 101 and the other communication apparatus 102 transmit and receive predetermined wireless frames (steps S606 to S613), performing the connection setup. The wireless frames transmitted and received at the time of the connection setup are also defined by the Wi-Fi Direct standard and other than the wireless frames in steps S606 to S613, the wireless frame described in the explanation of step S303 described above is also available.

The capability exchange/negotiation step (step S614) and the session establishment/reproduction start step (S615) of the communication apparatus 101 and the other communication apparatus 102 are, respectively, as described in the explanations of steps S304 and S305 described above. That is, the communication apparatus 101 transmits and receives a predetermined RTSP message defined by the Wi-Fi Display standard, and starts the video streaming (step S616) to the other communication apparatus 102. Note that the video streaming by the direct mode is performed here for the sake of descriptive simplicity.

Subsequently, the reproduction of the stored video in the communication apparatus 101 is terminated with the passage of a predetermined time or by a user operation (step S617), the communication apparatus 101 transmits and receives a RTSP PAUSE (M9) message (step S618). Consequently, the communication apparatus 101 pauses the video streaming to the other communication apparatus 102. At this time, the screen of the display unit 205 in the communication apparatus 101 is not displayed in the display unit of the other communication apparatus 102. Note that the display of the screen in the other communication apparatus 102 while the video streaming pauses is not the main subject to the present invention, and thus a description thereof will be omitted.

Note that a RTSP PAUSE request is normally transmitted from the other communication apparatus 102 serving as the sink device. It is also possible, however, to issue the RTSP PAUSE request to the sink device by applying a trigger at a RTSP SET_PARAMETER (M5) request from the side of the communication apparatus 101 serving as the source device. Note that it is possible to pause the screen sharing with the other communication apparatus 102 not only by transmitting and receiving the RTSP PAUSE (M9) message but also by not performing the video streaming from the communication apparatus 101.

Upon displaying the operation setting screen exemplified in FIG. 5 in the display unit 205 of the communication apparatus 101 (step S619), and receiving an instruction to continue the screen sharing from the user (step S620), switching over to the mirroring mode of the communication apparatus 101 and the other communication apparatus 102 is performed (steps S621 to S623). In switching over to the mirroring mode, the communication apparatus 101 first transmits and receives a RTSP SET_PARAMETER (M4) message (step S621), and sets a parameter used in the mirroring mode. Subsequently, the communication apparatus 101 starts video streaming (step S623) by mirroring to the other communication apparatus 102 upon transmitting and receiving a RTSP PLAY (M7) message (step S622).

Note that similarly to the RTSP PAUSE in step S618, a RTSP PLAY request is normally transmitted from the other communication apparatus 102 serving as the sink device. It is also possible, however, to issue the RTSP PLAY request to the sink device by applying a trigger at the RTSP SET_PARAMETER (M5) request from the side of the communication apparatus 101 serving as the source device. Note that if the RTSP PAUSE (M9) message is not transmitted and received in step S618, the RTSP PALY (M7) message also need not be transmitted and received in step S622.

Figure 7:
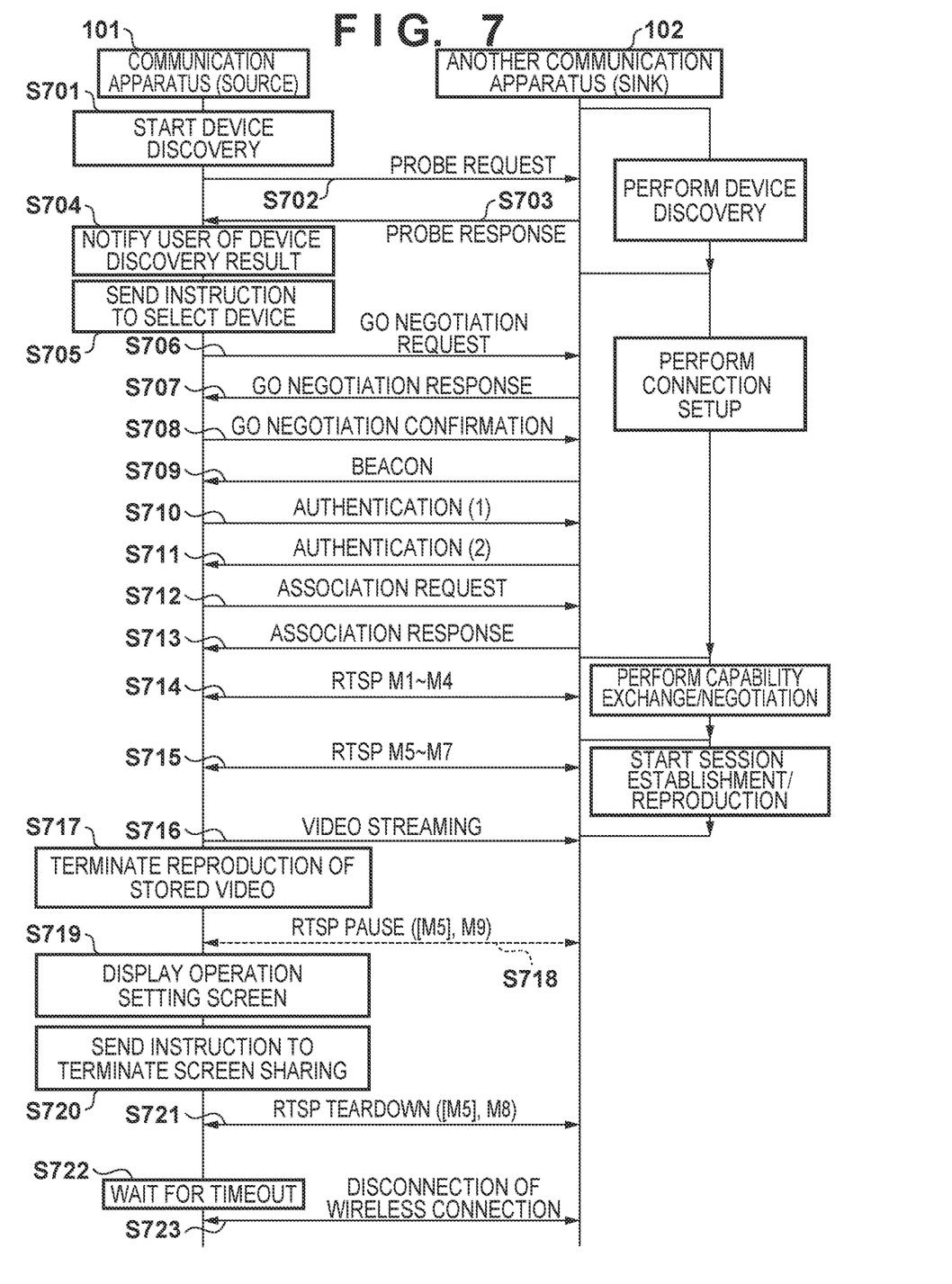
FIG. 7 is a sequence chart for explaining a connection sequence with the other communication apparatus 102 when the communication apparatus 101 does not continue the screen sharing after the end of the direct mode.

FIG. 7 is a sequence chart for explaining a connection sequence with the other communication apparatus 102 when the communication apparatus 101 does not continue the screen sharing after the end of the direct mode. The connection sequence (steps S701 to S719) between the communication apparatus 101 and the other communication apparatus 102 is the same as the connection sequence (steps S601 to S619) between the communication apparatus 101 and the other communication apparatus 102 in FIG. 6, and thus a description thereof will be omitted.

Unlike the sequence in FIG. 6, upon receiving an instruction to terminate the screen sharing from the user (step S720), the communication apparatus 101 terminates video streaming by transmitting and receiving a RTSP TEARDOWN (M8) message with the other communication apparatus 102 (step S721). Note that a RTSP TEARDOWN request is normally transmitted from the other communication apparatus 102 serving as the sink device. It is also possible, however, to issue the RTSP TEARDOWN request to the sink device by applying a trigger at the RTSP SET_PARAMETER (M5) request from the side of the communication apparatus 101 serving as the source device. Finally, when a predetermined timeout time has elapsed without the instruction to resume the screen sharing (step S722), the communication apparatus 101 disconnects the wireless connection (step S723) and terminates the screen sharing with the other communication apparatus 102.

Figure 8:
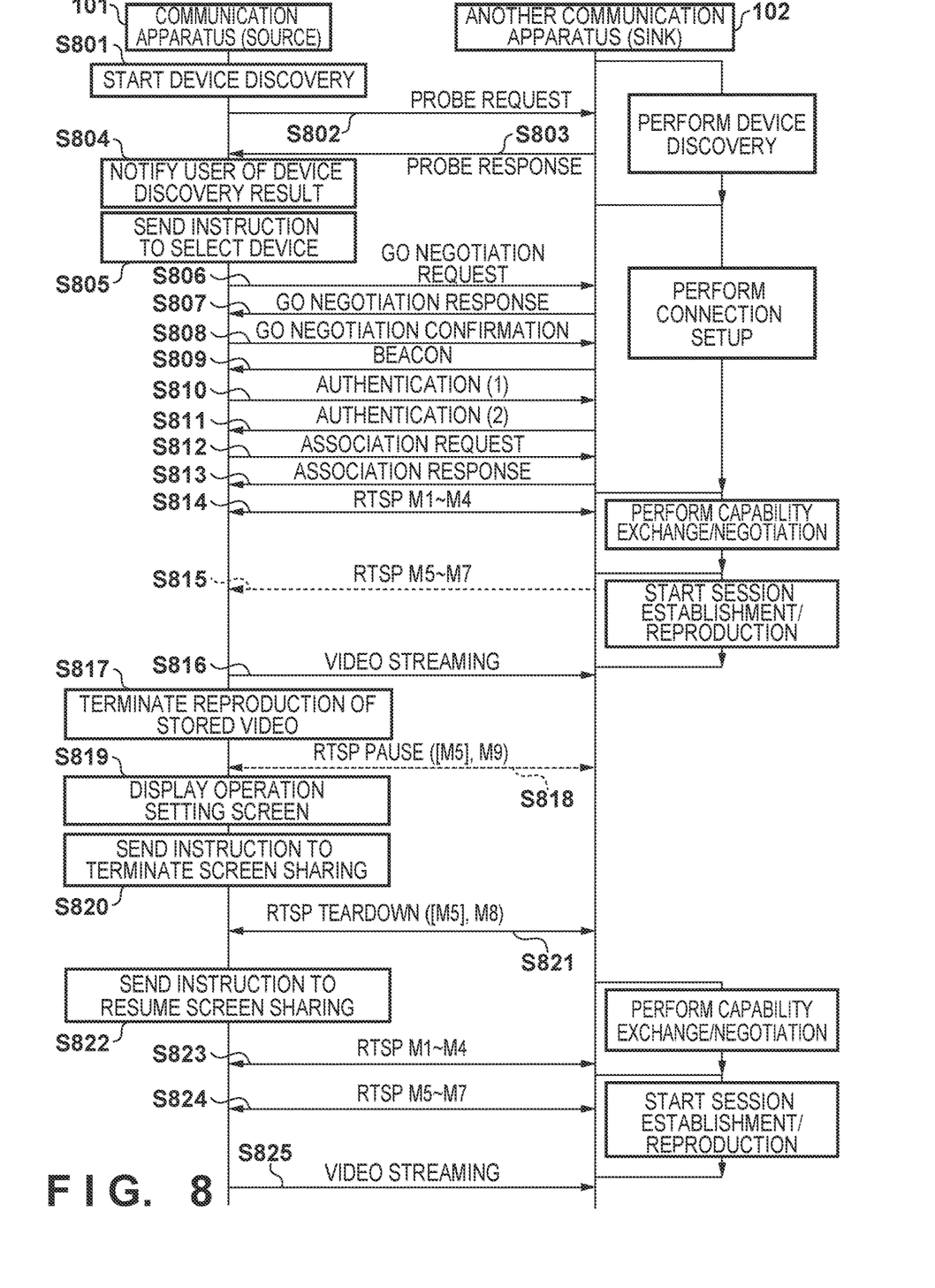
FIG. 8 is a sequence chart for explaining a connection sequence with the other communication apparatus 102 when the communication apparatus 101 resumes the screen sharing later without continuing it at the end of the direct mode.

FIG. 8 is a sequence chart for explaining a connection sequence with the other communication apparatus 102 when the communication apparatus 101 resumes the screen sharing later without continuing it at the end of the direct mode. The connection sequence (steps S801 to S821) between the communication apparatus 101 and the other communication apparatus 102 is the same as the connection sequence (steps S701 to S721) between the communication apparatus 101 and the other communication apparatus 102 in FIG. 7, and thus a description thereof will be omitted.

Unlike the sequence in FIG. 7, upon receiving an instruction to resume the screen sharing from the user (step S822), video streaming is resumed (step S825) after the respective steps of capability exchange/negotiation (step S823) and session establishment/reproduction start (step S824). A device discovery step (S802) and connection setup steps (steps S806 to S813) can be thus skipped at the time of resuming the screen sharing, making it possible to resume the video streaming more easily.

As described above, the communication apparatus 101 in the first embodiment displays, in the display unit 205, a screen for selecting whether to continue the screen sharing at the end of the direct mode and performs subsequent processing based on an operation from the user. This allows the user to decide whether to perform the screen sharing at the end of the direct mode as intended, improving operability/user convenience.

Second Embodiment

The communication apparatus 101 in the first embodiment described above is configured to display the operation setting screen at the end of the direct mode and control, based on the operation by the user, whether to continue screen sharing. In contrast, a communication apparatus 101 in this embodiment displays an operation setting screen only if screen sharing is performed by a mirroring mode immediately before a direct mode. Then, if the screen sharing by the mirroring mode is not performed immediately before the direct mode, the communication apparatus 101 terminates video streaming without displaying the operation setting screen.

Figure 9:
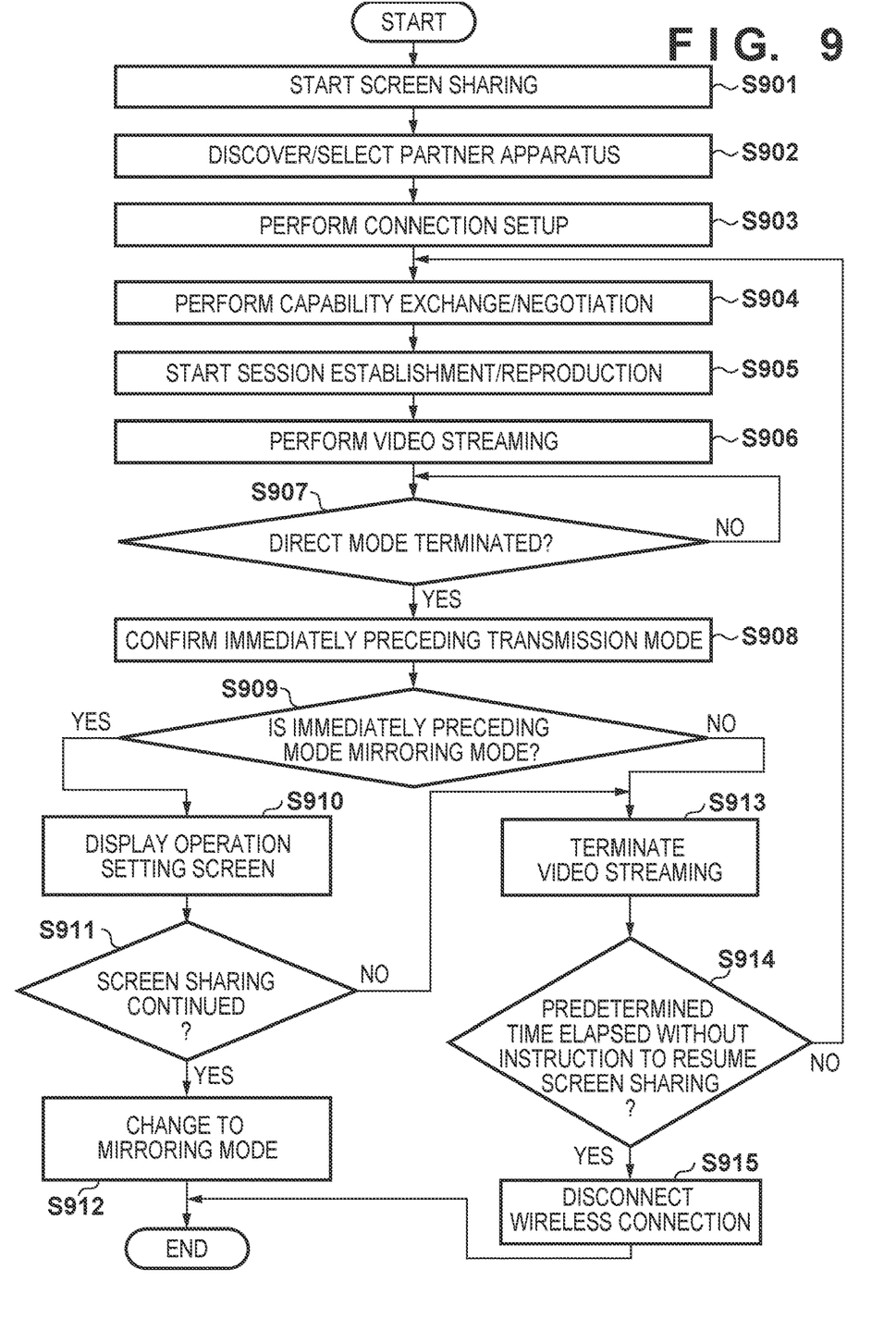
FIG. 9 is a flowchart showing an example of a procedure by which a communication apparatus mirrors a monitor screen with another communication apparatus according to the second embodiment.

FIG. 9 is a flowchart showing an example of a procedure by which the communication apparatus 101 mirrors a monitor screen with another communication apparatus 102 according to the second embodiment. In FIG. 9, the processes in steps S901 to S907 and S910 to S915 are, respectively, the same as the processes in steps S301 to S307 and S308 to S313 in FIG. 3, and thus a description thereof will be omitted.

In step S907, if it is judged that the direct mode is terminated (Yes in step S907), a mode management unit 214 confirms the mode of screen sharing performed immediately before the direct mode that has terminated just now (step S908). Subsequently, the mode management unit 214 determines whether the mode confirmed in step S908 is the mirroring mode (step S909). Only if the mode management unit 214 determines in step S909 that the screen sharing is performed by the mirroring mode immediately before the direct mode that has been terminated just now (Yes in step S909), a display control unit 211 displays the operation setting screen (step S910). On the other hand, if the mode management unit 214 does not determine that the screen sharing by the mirroring mode is performed immediately before the direct mode that has been terminated just now (No in step S909), the display control unit 211 does not display the operation setting screen, and a communication control unit 212 terminates the video streaming (step S913).

As described above, the communication apparatus 101 in this embodiment terminates the video streaming without displaying the operation setting screen if the screen sharing by the mirroring mode is not performed immediately before the screen sharing by the direct mode. This can control an operation of whether to continue the screen sharing at the end of the direct mode, making it possible to improve operability/user convenience.

Third Embodiment

The communication apparatus 101 in the second embodiment is configured to display the operation setting screen only if the screen sharing is performed by the mirroring mode immediately before the direct mode and terminate the video streaming without displaying the operation setting screen if the screen sharing by the mirroring mode is not performed immediately before the direct mode. In contrast, a communication apparatus 101 in this embodiment automatically switches an operation at the end of a direct mode in accordance with a mode immediately before screen sharing by the direct mode.

Figure 10:
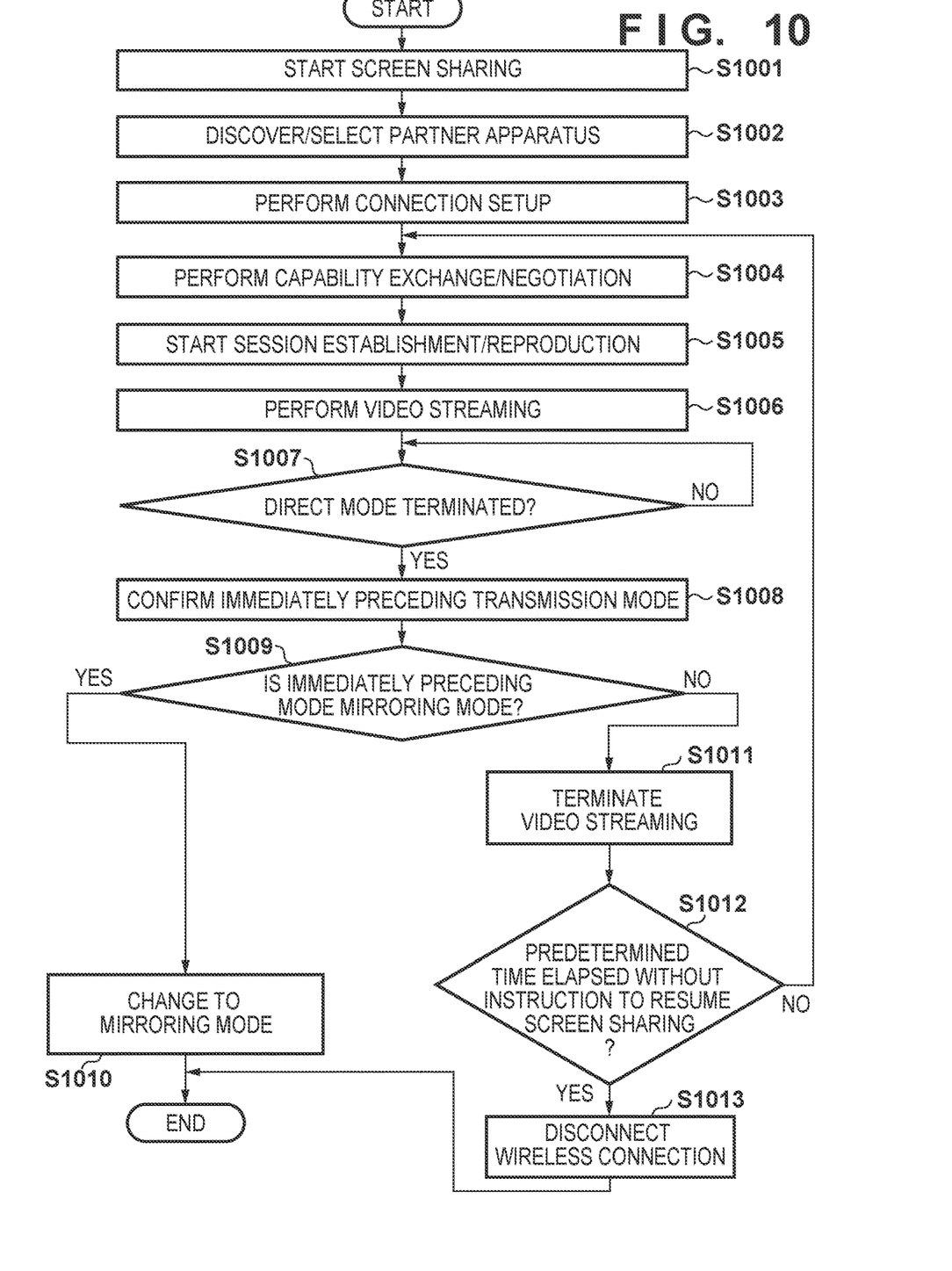
FIG. 10 is a flowchart showing an example of a procedure by which a communication apparatus mirrors a monitor screen with another communication apparatus according to the third embodiment.

FIG. 10 is a flowchart showing an example of a procedure by which the communication apparatus mirrors a monitor screen with another communication apparatus according to the third embodiment. In FIG. 10, the processes in steps S1001 to S1009 and S1010 to S1013 are, respectively, the same as the processes in steps S901 to S909 and S912 to S915 of FIG. 9, and thus a description thereof will be omitted.

In step S1009, if it is determined that the immediately preceding mode is the mirroring mode (Yes in step S1009), a display control unit 211 does not display the operation setting screen in a display unit 205. Moreover, a mode management unit 214 automatically switches over to the mirroring mode, and a communication control unit 212 continues screen sharing. On the other hand, if it is not determined that the immediately preceding mode is the mirroring mode (No in step S1009), the communication control unit 212 terminates video streaming (step S1011).

As described above, the communication apparatus 101 in this embodiment automatically switches the operation at the end of the direct mode in accordance with the mode immediately before the screen sharing by the direct mode. This can control an operation of whether to continue the screen sharing at the end of the direct mode, making it possible to improve operability/user convenience.

Other Embodiments

Note that the respective embodiments described above can be combined as needed, and a user may be able to set an apparatus in a specific embodiment out of the first to third embodiments to be operated by a communication apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-144753, filed Jul. 22, 2016, which is hereby incorporated by reference herein in its entirety.

What is claimed is:

1. A communication apparatus comprising:
   one or more processors; and
   one or more memories including instructions that, when executed by the one or more processors, cause the communication apparatus to:
   communicate with another communication apparatus in a first communication mode or a second communication mode,
   the first communication mode being a mode in which image data currently displayed on a display unit associated with the communication apparatus is transmitted to the another communication apparatus and is displayed on a display unit associated with the another communication apparatus, and
   the second communication mode being a mode in which image data which is not currently displayed on the display unit associated with the communication apparatus is transmitted to the another communication apparatus and is displayed on the display unit associated with the another communication apparatus; and
   in a case where image data transmission by the second communication mode is terminated, display a screen for receiving, from a user, a designation of whether or not to resume image data transmission by the first communication mode,
   wherein image data transmission by the first communication mode is resumed in a case where a designation to resume image data transmission by the first communication mode is received via the screen, and
   wherein the screen is displayed in a case where the terminated second communication mode was started by shifting from the first communication mode, whereas the screen is not displayed in a case where the terminated second communication mode was not started by shifting from the first communication mode.

2. The apparatus according to claim 1, wherein the execution of the instructions further causes the communication apparatus to:
   disconnect a connection with the another communication apparatus in a case where a designation not to resume image data transmission by the first communication mode is received via the screen.

3. The apparatus according to claim 1, wherein the screen is not transmitted to the another communication apparatus.

4. The apparatus according to claim 1, wherein the execution of the instructions further causes the communication apparatus to:
establish the connection with the another communication apparatus again in a case where the designation to resume image data transmission by the first communication mode is received via the screen.

5. The apparatus according to claim 1, wherein in a case where image data transmission by the second communication mode is started by shifting from the first communication mode, image data transmission by the first communication mode is terminated.

6. The apparatus according to claim 1, wherein the first communication mode complies with Wi-Fi Display standard.

7. The apparatus according to claim 1, wherein the second communication mode complies with Wi-Fi Display standard.

8. A method of controlling a communication apparatus, the method comprising:
communicating with another communication apparatus in a first communication mode or a second communication mode:
a first communication mode being mode in which image data currently displayed on a display unit associated with the communication apparatus is transmitted to the another communication apparatus and is displayed on a display unit associated with the another communication apparatus; and
a second communication mode being mode in which image data which is not currently displayed on the display unit associated with the communication apparatus is transmitted to the another communication apparatus and is displayed on the display unit associated with the another communication apparatus; and
in a case where image data transmission by the second communication mode is terminated, displaying a screen for receiving, from a user, a designation of whether or not to resume image data transmission by the first communication mode,
wherein image data transmission by the first communication mode is resumed in a case where a designation to resume image data transmission by the first communication mode is received via the screen, and
wherein the screen is displayed in a case where the terminated second communication mode was started by shifting from the first communication mode, whereas the screen is not displayed in a case where the terminated second communication mode was not started by shifting from the first communication mode.

9. A non-transitory computer-readable storage medium storing a computer program for causing a computer to execute a control method of a communication apparatus, the method comprising:
communicating with another communication apparatus in a first communication mode or a second communication mode:
a first communication mode being a mode in which image data currently displayed on a display unit associated with the communication apparatus is transmitted to the another communication apparatus and is displayed on a display unit associated with the another communication apparatus; and
a second communication mode being a mode in which image data which is not currently displayed on the display unit associated with the communication apparatus is transmitted to the another communication apparatus and is displayed on the display unit associated with the another communication apparatus; and
in a case where image data transmission by the second communication mode is terminated, displaying a screen for receiving, from a user, a designation of whether or not to resume image data transmission by the first communication mode,
wherein image data transmission by the first communication mode is resumed in a case where a designation to resume image data transmission by the first communication mode is received via the screen, and
wherein the screen is displayed in a case where the terminated second communication mode was started by shifting from the first communication mode, whereas the screen is not displayed in a case where the terminated second communication mode was not started by shifting from the first communication mode.

* * * * *